Aug. 20, 1963 K. G. BRUNBERG ETAL 3,101,392

TELEPHONE SYSTEM

Filed Feb. 12, 1959 5 Sheets-Sheet 1

INVENTORS
KARL GUNNAR BRUNBERG
BERNHARD LILLESUNDE
JOHN STURE LINDENHÄLL

BY Hane and Nydick

ATTORNEYS

INVENTORS
KARL GUNNAR BRUNBERG
BERNHARD LILLESUNDE
JOHN STURE LINDENHÄLL
BY Kane and Nydick
ATTORNEYS Aug. 20, 1963 K. G. BRUNBERG ETAL 3,101,392

TELEPHONE SYSTEM

Filed Feb. 12, 1959 5 Sheets-Sheet 3

INVENTORS
KARL GUNNAR BRUNBERG
BERNHARD LILLESUNDE
JOHN STURE LINDENHÄLL
BY Kane and Nydick
ATTORNEYS INVENTORS
KARL GUNNAR BRUNBERG
BERNHARD LILLESUNDE
JOHN STURE LINDENHÄLL
BY Hane and Nydick
ATTORNEYS INVENTORS
KARL GUNNAR BRUNBERG
BERNHARD LILLESUNDE
JOHN STURE LINDENHÄLL
BY Hane and Nydick
ATTORNEYS United States Patent Office 3,101,392 Patented Aug. 20, 1963

3,101,392
TELEPHONE SYSTEM

Karl Gunnar Brunberg, Segeltorp, and Bernard Lillsunde, Hagersten, Sweden, and John Sture Lindenhäll, Galion, Ohio, assignors to Telefonaktiebolaget L M Ericsson, Stockholm, Sweden, a corporation of Sweden Filed Feb. 12, 1959, Ser. No. 792,801
Claims priority, application Sweden Feb. 14, 1958
7 Claims. (Cl. 179—22)

Figure 1:
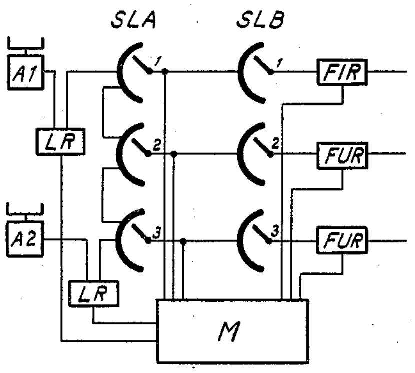

The present invention refers to an automatic telephone system comprising selecting stages which consist of switches of the cross-bar type and are built up of primary and secondary switches, and a marker identifying a calling line and connecting it to a called line through free bridges of the switches. The free bridges are selected by the marker by testing on signalling leads which each corresponds to a bridge and by its marking indicates the occupied or free condition of the respective bridge.

The switches used in such a telephone system can be of the type which a selecting magnet and an operating magnet respectively belonging to a selected group of contacts is energized and the group of contacts is maintained in operative condition during the time the operating magnet is fed by current during the conversation.

The switches could however be of another type, so-called code relay switches, in which the operating magnet affects one or more of a number of contact groups. The selection of the contact group to be operated is not carried out by means of selecting magnets but by means of code bars which by their position define which of the contact groups should be operable by the operating magnet. A code relay switch is described in United States application Serial No. 703,901 filed December 19, 1959, by Harald Valdemar Alexandersson, now Patent No. 3,060,274, and assigned to a common assignee.

In order to maintain the bridges in operative position in a usual telephone system a special holding wire is necessary and restoring is carried out by interrupting the current to the bridge by means of a link circuit relay set (or a line equipment). The holding wires imply of course a larger contact-multiple and in the case of a definite number of contacts, less capacity.

By maintaining the bridges in working condition after operation independently of the conversation connection without necessitating a holding wire and by restoring free bridges upon some suitable occasion independently of the conversation, the capacity can be increased and better use can be made of the contacts being at disposal. The bridges can be held without any holding wire, for example in such manner that the operating magnet winding holds itself through its own contact, the bridge can be held by means of permanent magnets or by means of mechanical locking in the case of a cross bar switch or for example by spring force in the case of a code relay switch and the operation of the operating magnet has only the purpose of removing the spring force during the time the closed contacts are replaced by other contacts. The problem in all methods of the above mentioned type of holding bridges is to restore free but not yet restored bridges to home-position.

The purpose of the present invention is to eliminate the holding wires and to make better use of the contacts being at disposal in a telephone system working with switches of the cross-bar type. This is obtained according to the invention in such manner that the bridges after operation are maintained operative independently of the conversation connection and that the marker upon a call releases all the bridges which are not restored and are not occupied by a conversation. That a free but not restored bridge has to be restored to home-position instead of awaiting a new setting up which is well possible, depends on the fact that bridges remaining operative can cause disturbances, for example reverse current paths.

Figure 4:
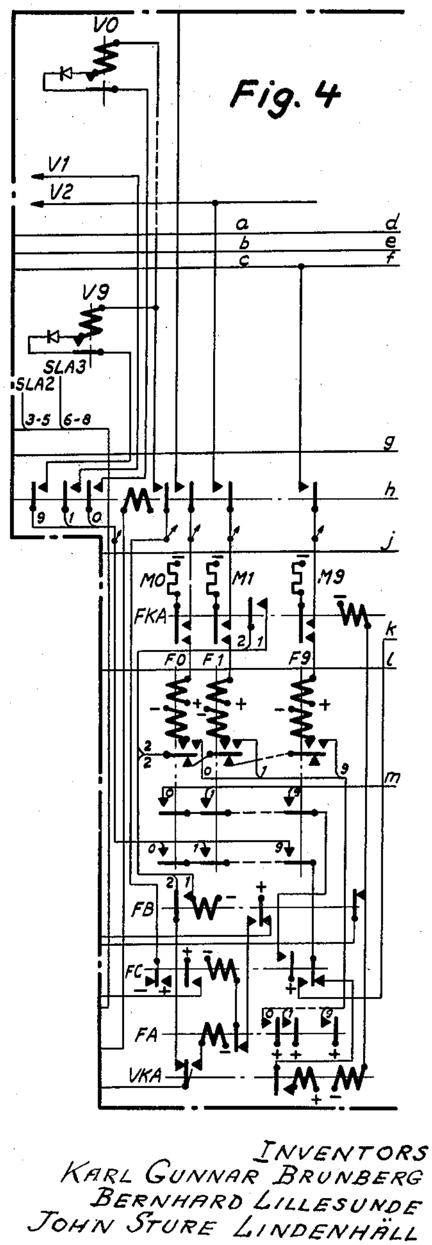
Figure 2:
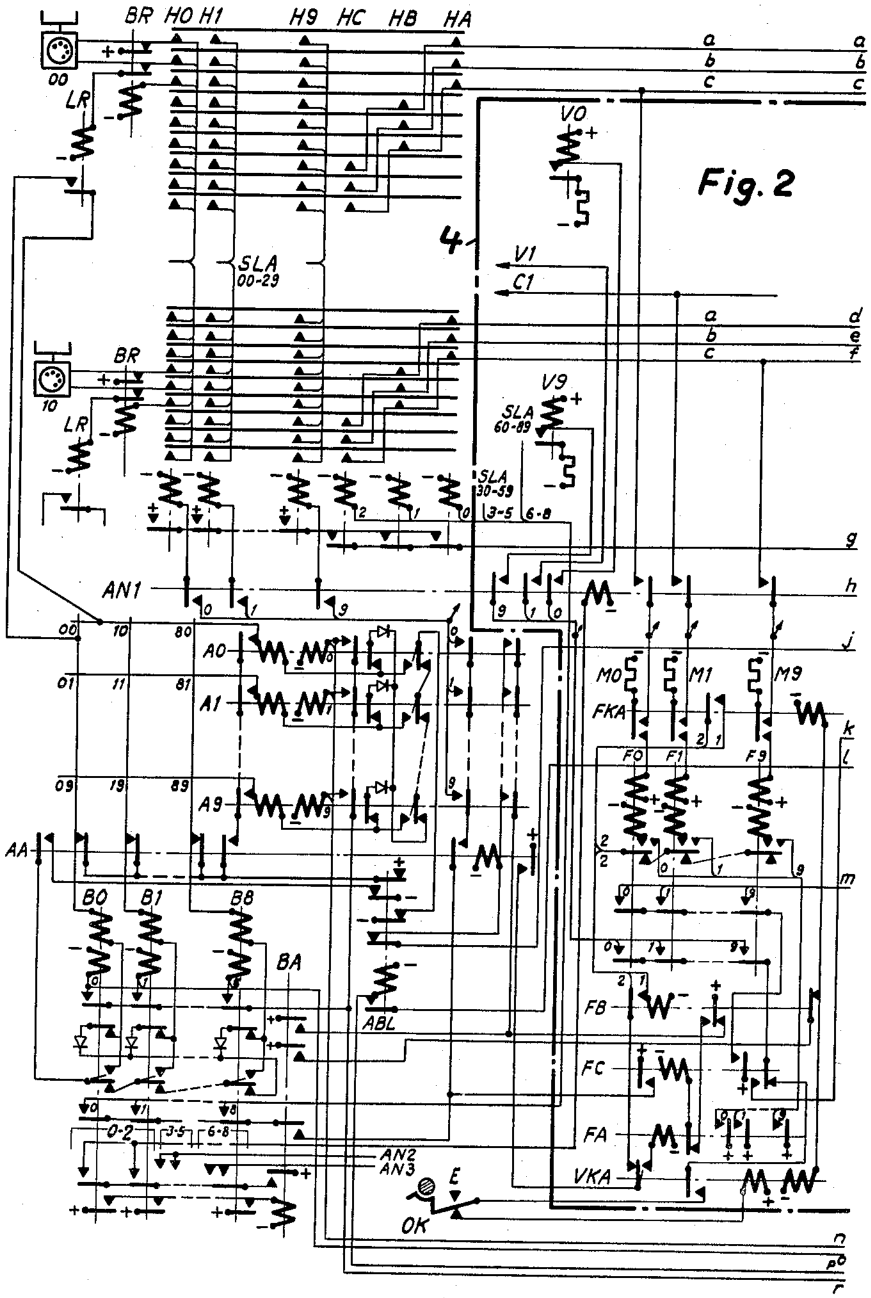
Figure 3:
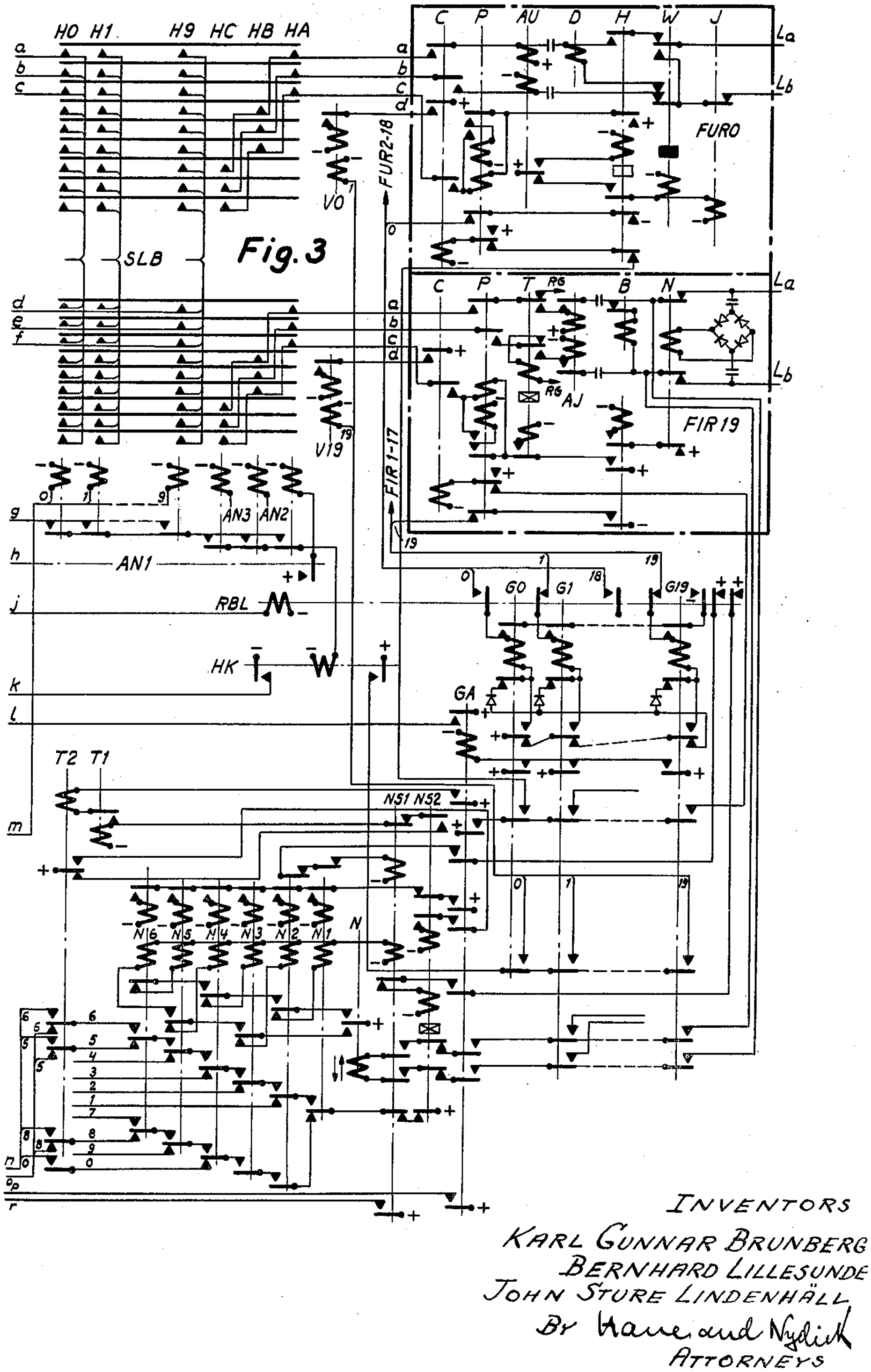
Figure 5:
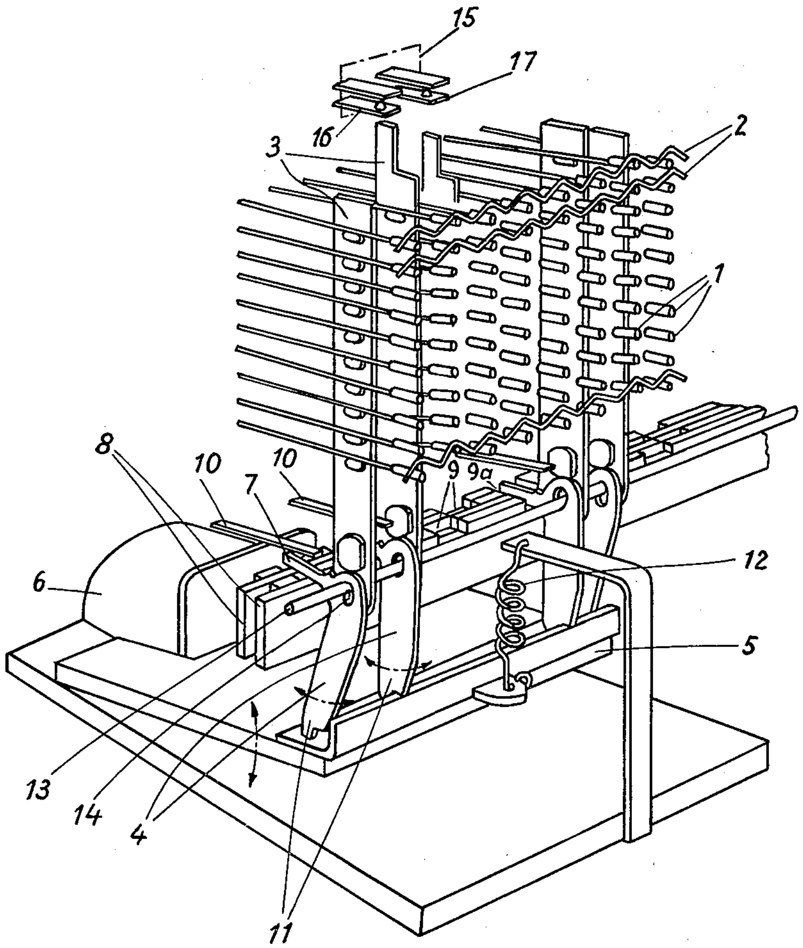
Figure 6:
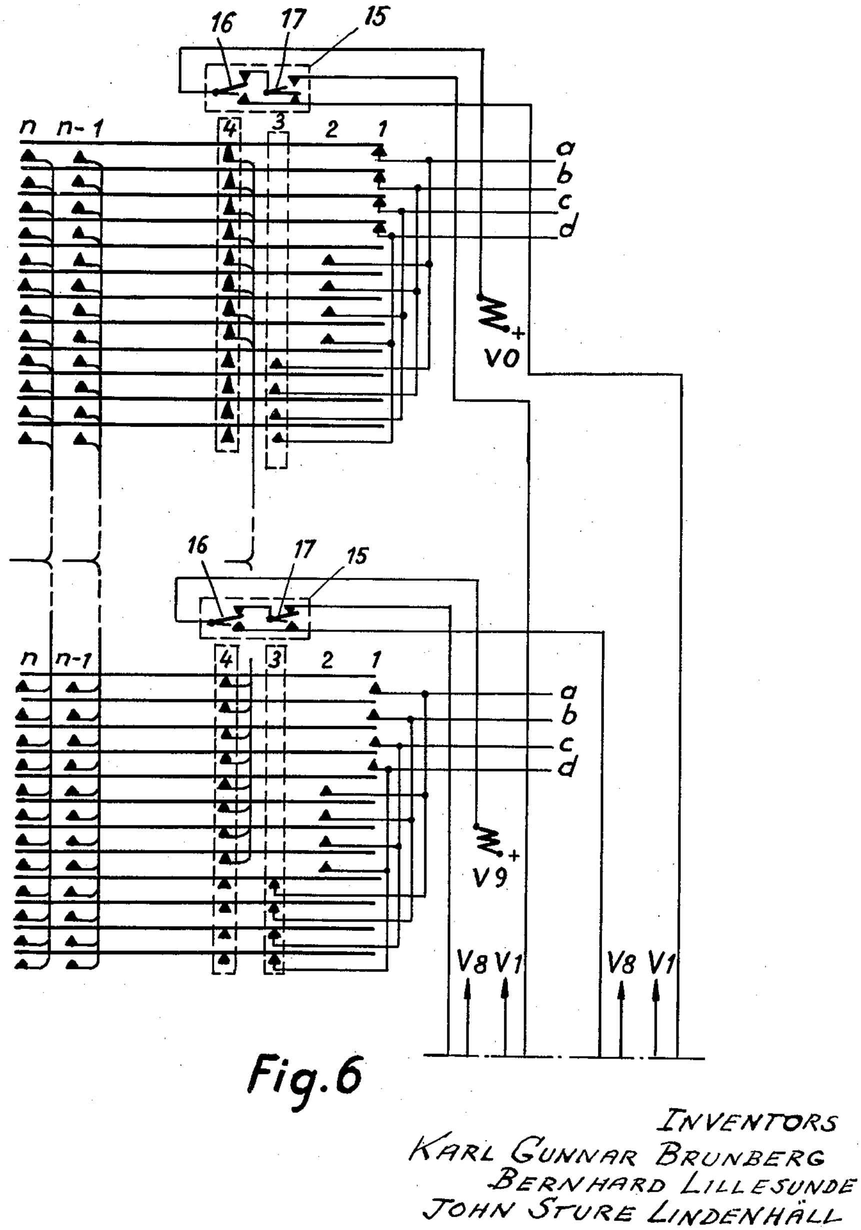

The invention will be explained more in detail by means of some embodiments with reference to the enclosed drawings in which FIG. 1 shows diagrammatically selecting stages in a telephone exchange comprising cross-bar switches. FIGS. 2 and 3 are showing a more detailed circuit diagram of a telephone system on which the idea of the invention has been applied and in which the bridges are holding themselves through an own holding contact. FIG. 4 shows a circuit diagram replacing a part of the diagram according to FIG. 2 and showing another solution in which the holding magnets consist of permanent magnets. FIG. 5 shows diagrammatically a code relay switch and FIG. 6 shows the grouping of the contacts of a code relay switch.

FIG. 1 shows a simplified diagram of a selecting stage consisting of two sub-stages SLA and SLB each comprising a number of cross-bar switches through which a subscriber A can be connected to an outgoing or incoming line equipment FUR or FIR respectively by means of a marker M which by testing determines which of the bridges are free. For the sake of simplicity only the testing wires are shown in this figure. Supposing now that the subscriber A1 is connected in conversation through an incoming line equipment FIR and the bridges SLA1 and SLB1, this would imply that the *c*-wire is occupied-marked and upon a call from another subscriber the marker will select a bridge among the bridges which are not occupied-marked. Owing to the fact that the bridges are not restored after the conversation there will be among the free marked bridges such ones which have not been restored, for example SLA2, and such as are restored, for example SLA3. The marker connects potential to the winding of all free-marked operating magnets whereby the bridges being still in operative position are restored. The potential can be of different polarity and values depending on in which manner the bridge is held. It can for example be of such polarity that the winding will be short-circuited if the bridge is held through its own contact, or of such polarity that it nullifies the remanent magnetization if the bridge is held by a permanent magnet, or it can be a so-called superplus, i.e. a polarity higher than the normal positive potential according to the manner in which the bridge is held. By connection of the potential all the not restored but free bridges will be released, according to the embodiment SLA2.

FIGS. 2 and 3 are more detailed circuit diagrams for a telephone system on which the invention has been applied. Only two bridges are shown as well in the cross-bar switch SLA as in the cross-bar switch SLB. The A-bridges have 13 bar positions in which contact groups can be affected by operation of the bridge. To each of 10 bar positions (digit bar) belong 9 contacts while to each of the other three selecting bars (storey bar) belong 3 contacts. Said 3 selecting positions can be obtained by means of one bar which causes contact also in the middle position. Corresponding contacts in the contact groups having 3 contacts are connected to each other and are connected to the 3-pole input of the bridge.

By affecting simultaneously a contact group having only 3 contacts and a contact group having 9 contacts, i.e. three 3-pole connections, it is possible to obtain a 3-pole connection from the input of the bridge to the line equipment of 30 subscribers. The B-bridges have similarly 9 contacts in the contact groups belonging to digit bars corresponding to three 3-pole connections, while 3 contact groups consisting each of 3 contacts belong to storey bars and are connected to corresponding contacts of the other 3 contact groups and are connected to the 3-pole input of the bridge.

By operating simultaneously one digit bar and one storey bar in the B-selector the 20 inputs of the B-bridges can be connected to 30 3-pole outputs which are multiplied across the B-bridges and correspond to the number of inputs of the A-switches.

The marker which has the purpose of finding a free connecting path through the switches comprises an identifier having 10 horizontal wires which are connected to the windings of relays A0–A9 and 9 vertical wires connected to the windings of relays B0–B8. Said wires form a coordinate system having 90 crossing points each belonging to a subscriber. A wire loop connects the wires crossing in the respective crossing points, through a make contact which will be closed when the subscriber lifts his handset and his line relay LR operates. If, for example, the subscriber 00 lifts his handset, a current path will be closed from the plus pole through a break contact of relay ABL, through a break contact of relay AA, the vertical wire through the crossing point 00, make contact of relay LR, the horizontal wire through the crossing point 00, the winding of relay A0, the rectifier, through the break contacts of the A-relays and to the minus pole through the break contact of relay ABL. The relay A0 operates and closes by its make contacts a current path from plus through a make contact of the relay FB to the winding of relay AA which operates and on one hand connects holding current to the relay A0 from its make contact, on the other hand connects minus from the break contact of relay ABL to the winding of relay B0 which already is connected to plus through the break contact of the relay LR and thus operates. By operation of the relay A0 which indicates the unit of the calling subscriber and of the relay B0 which indicates the tens of the calling subscriber, the subscriber will be identified.

The relay B0 connects plus potential to the winding of relay BA which operates and connects plus through its own make contact and through a make contact of B0 to the winding of relay AN1. AN1 operates and connects the operating wires of the SLA1-switch and the testing wires of the bridges to the marker. Relay AN1 operates, if the subscriber has number 0–29, i.e. is connected to the first A-switch. If the subscriber belongs to the second or the third 30-group, respectively, the relay AN2 respectively AN3 will operate.

Through a make contact of relay BA operate relay FKA and relay VKA. The relay FKA connects minus polarity to the testing wires of the bridges through resistances $M_0$–$M_9$. If the test wire of the bridge has no potential, i.e. the bridge is free, a circuit is closed through the winding of the respective F0–F9-relay and through the corresponding resistance $M_0$–$M_9$ whereby the test relays F0–F9 of all the bridges operate. A test relay belonging to an occupied bridge can however not operate as the test wire of such a bridge has plus potential as will be clear of the description, and the respective F-winding has in this case plus polarity at both terminals.

By operation of the relay VKA plus polarity has been connected to the relay FA which in turn through its make contacts connects holding plus to all the F-relays which have operated. Through make contacts of the operated F-relays plus polarity is connected through a low-resistance winding of the relay VKA to all the bridges, the relays F of which have operated. As appears from the diagram according to the embodiment each operating magnet of the SLA-switch is provided with a holding contact, through which the operating magnet is maintained operative also after the conversation has been terminated. The bridges of the SLB-switches are common bridges as they according to the diagram do not necessitate any special contact in the switch itself. As has been pointed out in the preamble, the purpose of the invention is to restore all the locked bridges by means of the marker and this is carried out by said F-relays. By connecting plus polarity to all the operating magnets, the windings of all the operating magnets, which have been operative until now, will be short-circuited, so that all the bridges which are not occupied by a conversation, will be restored. The relay VKA is held from minus polarity through the contact of one of the operated bridges, so that if all the bridges have been restored, the relay VKA will release and will connect plus polarity to a break-out row for the relays F. The relay FA releases and disconnects plus polarity from the relays F so that all the relays F will release, except that one, which is connected to the plus polarity of the breaking-out row. The relay FB, through the break contact of which the relays FKA and VKA have been connected to plus polarity, will operate and interrupt the current through the operating windings of the relay FKA and VKA. A switching contact of a relay FB has through a contact of the relay FA connected plus polarity to the relay FC, which operates as a sign that the breaking out is carried out and through its contacts it connects plus polarity to the SLA- and SLB-selector bars and prepares operation of the selected SLA-bridge. By the F-relay operated the bridge in the SLA-switch is defined.

A selection of a free bridge in the SLB-switch is carried out by testing by means of the relays G against the outgoing line equipments FUR0–18 connected to the respective bridges. The relay RBL operates by means of plus polarity through a break contact of the relay FB, through a make contact of the relay A0 and a break contact of the relay ABL and it connects the relays G to the testing wires of FUR0–18. Only those of the relays G can operate which find minus polarity in one of the equipments FUR through a break contact of the relay H as a sign that said equipment is free. One of the relays G, for example G0, will operate by means of plus through contacts of the G-row and disconnect all the other relays G as the relays G are connected in a breaking-out row. By operation of the relay G0 the SLB-bridge will be defined. The relay GA operates now by means of plus polarity through a make contact of the relay G0.

The relay HK operates through make contacts of the SLA- and SLB-bars and connects minus polarity to the selected SLA-bridge, so that this latter will operate. The relay HK connects also plus polarity through the relay G0 to the selected SLB-bridge which will operate. The relay GA connects plus polarity to the relay C through a make contact of the relay G0. The relay C connects the wires *a, b, c, d* to the input of the SLB-bridge. By the operation of the relay C a connection comprising 3 wires has been established between the line equipment and the subscriber calling. A current feeding relay AU obtains current through the subscriber loop and operates. The holding relay H operates by means of plus polarity through a make contact of the relay AU and connects plus polarity to the testing relay P, which operates in series with the BR-relay of the subscriber through the c-wire of the connection and through a make contact of the relay C. By operation of the relay BR the marker is released. The relay P disconnects minus polarity to the testing wire leading to the marker, and it holds itself by means of plus polarity from a make contact of the holding relay H.

When the relay H operates, a choke D is connected to the line, whereby a call is carried out in the joining exchange. When the subscriber dials the number, the impulse relay I follows the dialling impulses, while the impulse relay W, which is slow in release, remains operated during the impulse train. It releases on the other hand during the interval between the impulse trains. The relay H, which is slow as well in operation as in releasing, is remaining operative during the whole dialling.

When the subscriber replaces his handset, the relays A, H, P and C are released in turn, and by the release of the relay C the plus polarity is interrupted for the relay BR which releases. The line equipment is now free for the next call. The connection through the switches has been interrupted by disconnection of the line equipment ,the bridge of the SLA-switch is however remaining in its position as is clear from the aforesaid, until it will be restored by the marker upon the next call.

When a call is coming in, a line equipment FIR is seized by means of a potential through the line, the relay B operates and connects minus polarity to one of the relays G1–19 belonging to each FIR, so that the relay G operates and identifies the line equipment. As the relays G are connected in a row as before mentioned, the operated relay G prevents a call from another FIR or connection of a FUR for outgoing calls.

If one of the relays G, for example G19, operates, the relay GA will operate by means of plus polarity through a make contact of the relay G19. The relay C of FIR is connected to plus polarity through contacts of the relays GA and G19. Through a make contact of the relay GA a relay NS1 is connected to plus polarity through a break contact of the relay RBL so that it operates. Hereby a polarized relay N is connected to the talking wires through contacts of GA and G19, so that the relay N can receive digits from the register in the form of subsequent plus and minus signals. In correspondency to the number of subsequent polarity reversals a number of the relays N1–N6 will operate, so that a plus polarity can be connected through contacts of said relays from a break contact of the relay NS2 to one of the 10-relays B in the identifier, which corresponds to the received first digit, as soon as the relay NS1 has released. The current of the upper winding of the relay NS1 is disconnected, when the relay N1 or N2 operates, which occurs independently of which digit has been received. The relay NS1 is however held by means of its lower winding as long as the lower windings of the relays N1–N6 obtain plus polarity through the contacts of the relay N. After the last impulse the relay NS1 will release implying operation of NS2. Operation of the relay NS2 occurs with delay, so that during a short time as well NS1 as NS2 is released. During this time a plus polarity is connected to the selected B-relay from the break contact of relay NS2 through contacts of the operated relays N1–N6, after which releasing of NS2 causes operation of said relays. The relays NS1 operates now again through the contacts of the released relays N1 and N2, but before this a plus polarity has been connected through the contacts of the relay NS1 and NS2, from a break contact of relay T2 to the winding of relay T1. The relay T1 operates and connects the winding of relay T2 to plus polarity in series with its own winding. The relay T2 can however not operate as both its terminals have plus polarity. The relay NS1 interrupts upon its operation the current path to the winding of the relay NS2, so that the relay NS2 is released and it connects again the relay N to the talking wires. By releasing of the relay NS2 the current path to the relay T1 from the break contact of the relay T2 is interrupted, so that now the windings of the relays T1 and T2 are connected in series to plus polarity through the make contact of relay GA. Now the relay T2 can operate and switch the digit wires from the contacts of the relays N1–6 to the relays A, i.e. the unit relays of the identifier. The other impulse train is now received in exactly the same manner as the first one, the only difference will be that, when the relay NS releases and NS2 operates at the end of the impulse train, the last mentioned is held operative by means of plus polarity through a make contact of the relay T2, whereby receiving of further signals from the talking wires is prevented. After that one A-relay and one B-relay have operated, the process will be exactly the same as upon an outgoing call. The marker hunts for a free bridge in the SLA-switch by testing on the *c*-wire of the link and it selects a free bridge in the SLA-switch. As in this the line equipment FIR19 has been selected, the relays C in this is operative so that, when the SLA- and SLB-bridges are operative, said bridges will connect the called subscriber to FIR19. The testing relay P will now operate by means of plus polarity from the make contact of the relay B in series with the relay BR of the subscriber, if the subscriber is idle, and it connects through its contacts ringing alternating current to the line of the subscriber through the contacts and through the winding of a trip-relay T. If the subscriber is busy, the *c*-wire leading to his BR-relay, is marked by plus polarity, so that the relay P cannot operate. If the subscriber answers, the relay T will operate by means of direct current passing through the subscriber loop, the relay T obtaining holding by means of plus polarity from the break contact of the relay B and it connects the current feeding relay A1 to the subscriber, so that the connection is now connected through. By operation of the relay P the current to the winding of the relay G19 is interrupted, so that the latter is released causing all the relays of the marker to release and the marker is now free for the next call. Disconnecting of the line equipment is carried out by means of alternative current fed from the line when the called subscriber replaces his handset. The disconnecting relay N operates and interrupts the current to all the relays in the equipment.

According to another embodiment of the invention it is possible to use, instead of operating magnets holding themselves through an own contact, permanent magnets which upon operation of the bridge are magnetized and retained owing to remanence. Operating magnets of said type can be released by sending a direct current through the winding, the direction of which is opposite to the direction of the magnetizing current, so that the permanent magnet is de-energized. This occurs however not before the marker has been called, as mentioned before.

A circuit diagram showing an application of the idea of the invention on permanent operating magnets is shown in FIG. 4. This circuit diagram replaces the part of the circuit diagram in FIG. 2 framed and designed by 4. The function of the arrangement is exactly the same as in the foregoing case until the selecting of a free SLA-bridge. By operation of the relay VKA plus polarity is connected to the relay FA, which in turn through its make contacts connects holding plus to all the F-relays which have operated. Through the make contacts of the operated F-relays a potential is connected to the windings of the operating magnets, the polarity of which potential is opposite to the polarity necessary for magnetizing the operating magnets. A rectifier is connected in series with each of the operating magnets in order to prevent that the not magnetized magnets will be magnetized in opposite direction. Only through the windings of the bridges which are free but not restored can a current pass. When all the bridges have released, the current through the holding winding of the relay VKA will be interrupted, so that the relay VKA will release. Hereby the relay FA releases and the process will be exactly the same as in the foregoing case.

The invention is of course not limited to the shown embodiments but a large number of variations are possible without leaving the scope of the invention. It is possible, for example, that a fixed polarity is connected to one end of the bridge winding and the bridge holds itself through its own contact and the releasing of the bridge is carried out by means of a super-plus, i.e., the plus polarity higher than the plus polarity used in the telephone system. In this case the low-resistance holding winding of the relay VKA through which the releasing current of the bridges passes in the embodiment earlier described (FIGS. 2–3) is not used but the current path can be switched, for example by means of a hand switch OK to a super-plus E. Connection of this super-plus can be carried out through a make contact of the relay VKA, exactly in the same manner as normal plus polarity has been connected in the earlier described case. The relay VKA has to be slow in release in this case in order to restore the bridges with security before releasing of the relay VKA. For the rest the function is exactly the same as in the embodiment described before.

It is also possible to use a combination of holding through own contact and of remanence in the magnet circuit in order to decrease the necessary effect for holding the bridge. It is also possible to lock the bridge mechanically and to release it by means of the marker in the manner hereabove described.

The invention can also be applied on a telephone system working with code relay switches. A code relay switch has a plurality of contacts arranged in parallel rows which upon operation each can be brought into engagement with a conducting bar extending parallelly to each contact row. The contacts registering transversely of the bars, in so-called vertical rows, are operated simultaneously, so that an incoming line, the wires of which are connected to the contacts of a certain vertical row, can through the bars be connected to an outgoing line, the wires of which are connected to the contacts of another vertical row, by simultaneously affecting said two contact rows.

FIG. 5 shows diagrammatically a code relay switch, more exactly a bridge unit, of which a number, for example 10, are combined to a switch. The contacts 1 form horizontal and vertical rows. Parallelly with each horizontal row extends a bar 2 with which the contacts are coming in engagement upon operation. In order to operate all the contacts of a vertical row at the same time, operating means are arranged for each vertical row, said means comprising a lifting bar 3 and a bell crank-shaped lever 4 which can be rocked by the armature 5 of a bridge magnet 6 and which by means of the lifting bar 3 presses the contacts of the respective row against the conducting bars. The levers can be rocked freely only in the case the lever arm 7 is not prevented in its movement by code bars 8. Said code bars are parallel strips which by means of code magnets (not shown) are longitudinally displaceable from a rest position to an operative position and which strips are provided with recesses 9 in such manner, that upon displacement of certain strips and maintaining certain strips in the rest position, through-recesses 9*a* occur below a selected vertical row depending on which of the code magnets are operated. Only those of the levers can rock, one arm 7 of which can freely pass through a through-recess 9*a* upon rocking when pressed into said recess by means of a spring 10. The armature 5 of the bridge magnet prevents however such a rocking movement when it is not operated as it engages the lower arm 11 of the levers. When the bridge magnet operates, at least two levers can be rocked by the springs 10, so that, when the current to the bridge magnets is interrupted and the armature 5 is returned to rest position by a restoring spring 12, the arms 11 of the rocked levers will come into engagement with the armature. In this way the levers which are supported on a shaft 13 extending through a longitudinal opening 14 in the levers, will be displaced, so that also the lifting bars belonging to the levers will be displaced and will close the vertical contact rows belonging to the same.

It is possible as well practically as theoretically not to restore the two operative levers and the associated contact rows to rest position after the end of the conversation but to operate upon the next call two other levers which, when the bridge the next time is operated and released respectively, change places with the levers operated before, so that two other vertical contact rows are closed. It can however be necessary to bring the bridge into rest position from the point of view of connection before the next setting up is carried out in order to eliminate that for example back current paths occur through the operated but in conversation no longer occupied contacts. The structure of the code relay switches is such that also in this rest position or home-position two levers are operated, though said two levers do not cause any connection as in the other cases. On one hand it is necessary to have the same spring tension of the restoring spring 12 and the same position of the armature 5 as in the other positions. On the other hand it will be possible in this manner to make use of the rest position for a simple operation of a home-position contact which marks the set up or the restored condition of the bridge, respectively. The home-position levers are affected when all the code bars are in rest position as they can in this position rock freely into the through-recesses 9*a* of the code bars. The home-position contact is operated mechanically by the two home-position lifting bars, the function of which both is the condition of the closing of the home-position contact. According to FIG. 5 the home-position contact 15 consists of two contact members 16 and 17 each of which is operated by its own lifting bar and which contact members are connected in series in such manner that upon the function of both lifting bars a circuit will be interrupted, while upon the function of only one of said lifting bars a current can pass. The home-position contact 15 can of course consist of a single contact mechanically affected by the two lifting bars together and interrupted only in the case both lifting bars are operative. As is clear from the description hereabove the restoring of the bridge is carried out by connecting a current impulse to the bridge magnet implying that the idea of the invention can directly be applied to a code relay switch.

FIG. 6 shows an embodiment for the grouping of the contacts in a code relay switch having 12 horizontal and $n$ vertical contact rows. If for example a 4-wire connection is requested, the contacts in a vertical row are sufficient for 3 connections. The incoming line is connected to 3 vertical rows 1, 2 and 3, in each vertical row to different horizontal positions, while each of the other vertical rows comprises 3 outgoing lines. Upon operating one of the vertical rows of the input and the vertical row of the output, a connection is obtained between said rows and thus between the incoming and outgoing line. In FIG. 6 two switches are shown, one of which is in set up condition and the other in restored position, also the contact means 16, 17 of the home-position contact 15 being shown in its relative position to the lifting bars. As is clear the contact means consist of switching contacts which in the set up position of the bridge, in which only one of them can be operative, allow passing of current (the upper switch in the figure) while said contact means in the restored position of the bridge interrupt the current path (the lower switch in the figure). Both contact means are affected if the lifting bar 3 and lifting bar 4 are operated simultaneously. The lowest group in vertical row 4 is not connected to any outgoing line in order to prevent that in the home-position of the bridge a connection will be established. The vertical row 3 causes of course connection together with other vertical rows 5 to $n$ without affecting the home-position contact and the case is similar, if the vertical rows 1 and 2 are affected together with the upper groups in vertical row 4.

Restoring of the bridges of the code relay selector is carried out in the same manner as is explained in connection with FIGURES 2–3 and 4, respectively. When the marker has to set up the next call, testing is carried out against the testing wire $c$ of the bridge. In the same way as in a cross-bar switch, free bridges can have two different conditions, thus they can be restored and not restored, in which last mentioned case they have to be restored by the function of the marker. In the embodiments earlier described, restoring of the bridges has been carried out thereby that, for example, a short-circuiting polarity or a de-magnetizing current has been connected to the operating magnet. As in the code relay selector the bridge is held in operative position by the spring force of a spring, said spring force can be removed by connecting also in this case a current to the operating magnet, so that this magnet operates. A current impulse is sent to all the free bridges from the marker but only the free bridges which are set up are affected as the current has to pass through the home-position contact 16–17 and this contact is interrupted in the restored bridges. The restoring of the bridges is consequently carried out in a corresponding way as in cross-bar switches. In order not to prevent in setting up the operation of the bridges by the home-position contact which interrupts the operating current path for the restored bridges, the home-position contact is arranged in such manner, that at the same time as it interrupts the current path for restoring, it closes a current path for setting up the bridge. The function of the arrangement is for the rest clear from the above explanations given in connection with FIGURES 2–4.

We claim:

1. An automatic telephone system comprising, in combination, selecting stages including crossbar switches having contact bridges being self-locking in contact closing condition independently of the termination of a speech connection thereto and restorable into open condition by changing a potential supplied to the bridges, test-wires associated with each of the bridges and indicating by their potential condition the busy and idle state respectively of the respective bridge, a marker, including means for identifying a calling line, means supplying a potential to bridges marked idle by the respective test-wires for restoring all the idle bridges not restored previously to said open condition, means for selecting one of the idle bridges in each stage, and means for setting up a connection to a called line through said selected bridges.

2. An automatic telephone system comprising, in combination, selecting stages including crossbar switches having contact bridges and magnets for holding the bridges in contact closing condition, said magnets having coils connected to a potential at one terminal and provided with a contact at the other terminal, said contact connecting an energizing circuit to the magnet to close a hold circuit for the magnet through said contact when said potential is connected to said coils, test-wires associated with each of the bridges and indicating by their potential condition the busy and idle state respectively of the respective bridge, a marker including means for identifying a calling line, means for supplying to the contacts of the bridges marked idle by their test-wires a potential of the same polarity as the potential at said one terminal of the magnet coils to de-energize the bridge magnets, means for selecting one of the idle bridges in the respective stages, and means for setting up a connection to a called line through the selected bridges.

3. An automatic telephone system comprising, in combination, selecting stages including crossbar switches having contact bridges and bridge magnets for holding the bridges in contact closing condition, said magnets including magnetizing coils, said magnets being energized by supplying current to said coils and held in said energized condition by magnetic remanence, a marker including means for identifying a calling line, means for supplying to the bridge magnet coils of idle bridges a current having a direction opposite to said energizing current to de-energize the bridge magnets for returning the same into a de-energized condition, means for selecting one of the idle bridges in the respective stages, and means for setting up a connection to a called line through the selected bridges by supplying an operating current to the latter.

4. An automatic telephone system according to claim 2, in which a rectifier is connected in series with each of the bridge magnet coils to prevent, upon de-magnetizing of the not restored magnets, magnetizing of the restored magnets in opposite direction.

5. An automatic telephone system comprising, in combination, selecting stages including crossbar switches having contact bridges and magnets for holding the bridges in contact closing condition, said magnets having coils connected to a potential at one terminal and provided with a contact at the other terminal, said contact connecting an energizing current to the respective when said potential is connected to said coils for holding them in an operative state through said contact, test-wires associated with each of the bridges and indicating by their potential condition the busy and idle state respectively of the respective bridge, a marker including means for identifying a calling line, means for supplying to the bridge magnets a potential having a polarity opposite to that holding the magnets in said operative state, means for selecting one of the idle bridges in the respective stages, and means for setting up a connection to a called line through the selected bridges by supplying an operating potential to the latter.

6. An automatic telephone system comprising, in combination, selecting stages including crossbar switches having contact bridges including contact groups held in contact closing condition by spring-force and bridge magnets releasing, when operated, a selected closed contact group and moving another selected contact group into closed condition, the contacts in one of the contact groups in each bridge being blind contacts thereby constituting a home position of the bridge, test-wires associated with each of the bridges and indicating by their potential condition the busy and idle state respectively of the respective bridge, a marker including means for identifying a calling line, means for supplying, in response to a call, to the bridge-magnets of the idle-marked bridges a current of short duration in order to restore said bridges to home position, means for selecting one of the idle bridges in the respective stages, and means for setting up a connection to a called line through the selected bridges by supplying an operating current to the latter.

7. An automatic telephone system according to claim 6, in which the bridges are provide with contacts which are interrupted in home position and connected in series with an operating current path for the bridge magnet in order to prevent that already restored bridges obtain a restoring current impulse.

References Cited in the file of this patent

UNITED STATES PATENTS

| | | |
|---|---|---|
| 1,681,035 | Gardner | Aug. 17, 1928 |
| 2,031,692 | Carson | Feb. 25, 1936 |
| 2,416,710 | Myer | Mar. 4, 1947 |